Dec. 27, 1938.  L. R. TALLMAN  2,141,493
PICK-UP MECHANISM
Filed April 24, 1936  2 Sheets-Sheet 2
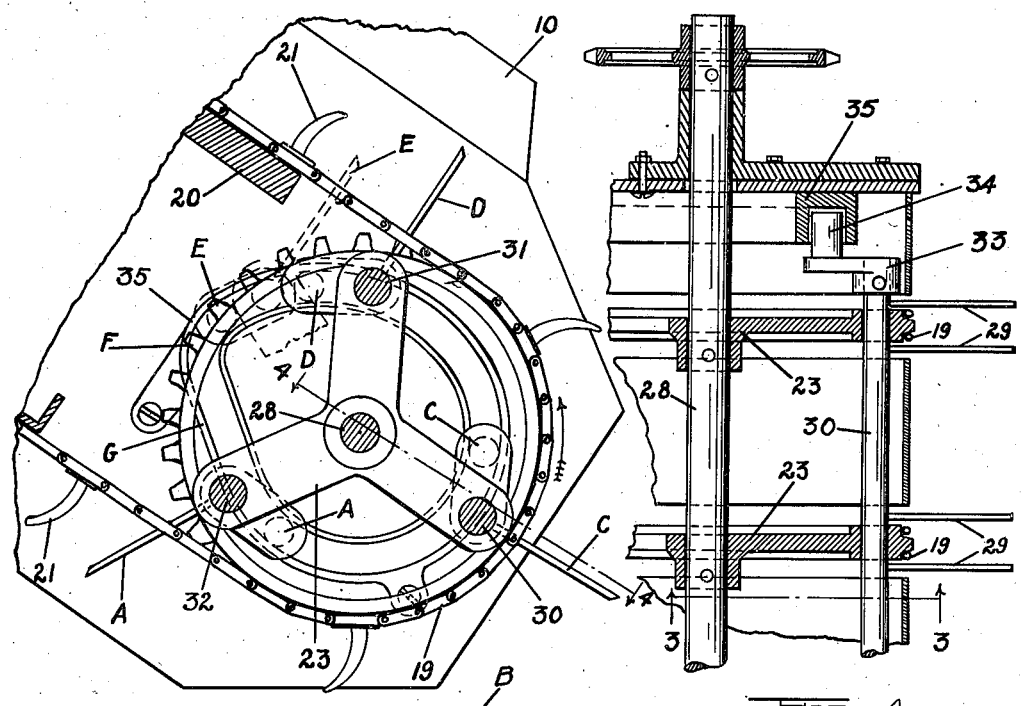
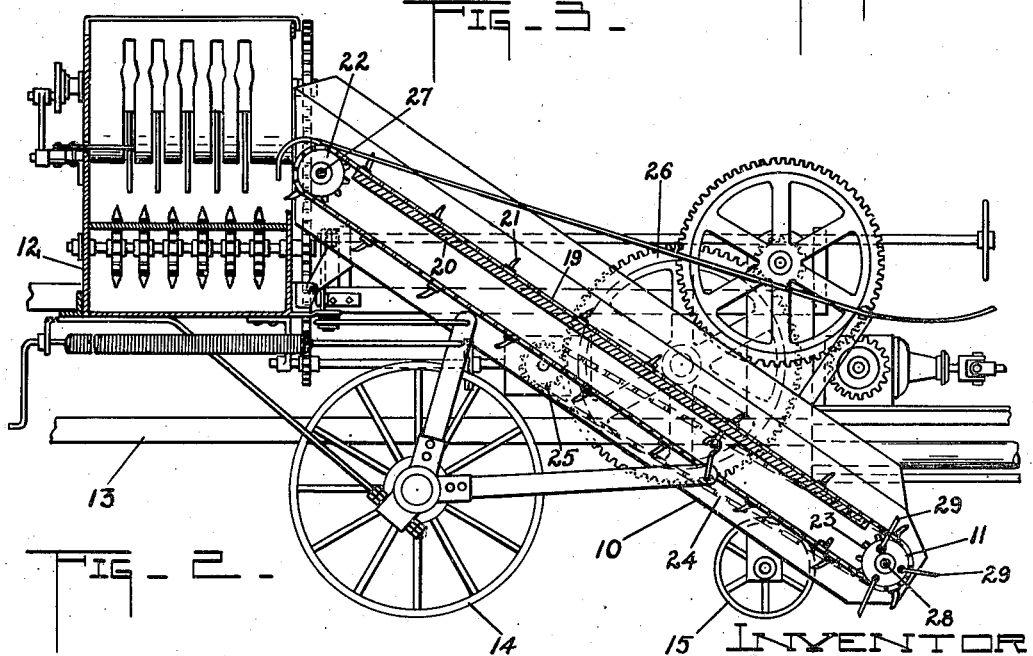

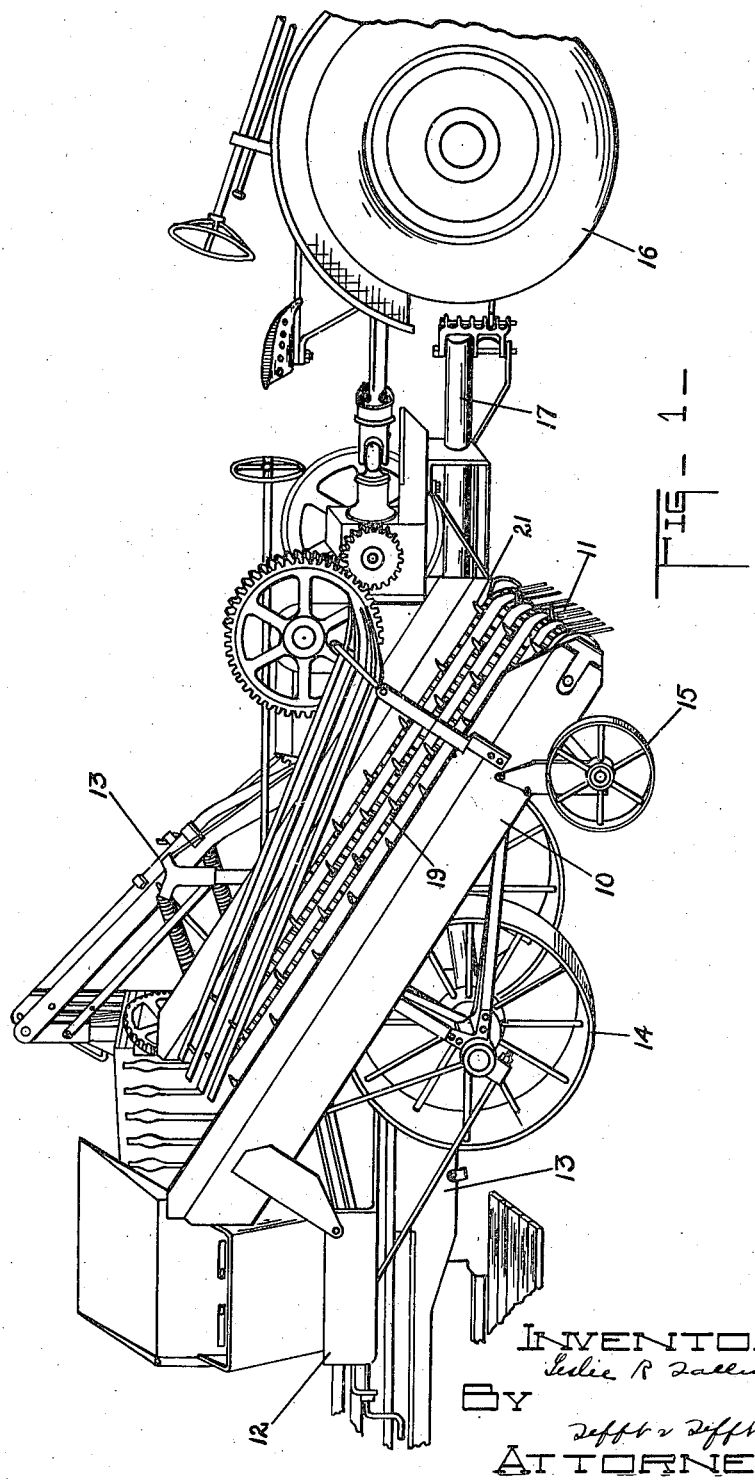

Patented Dec. 27, 1938

2,141,493

UNITED STATES PATENT OFFICE 2,141,493

PICK-UP MECHANISM

Leslie R. Tallman, Shelbyville, Ill.

Application April 24, 1936, Serial No. 76,170

1 Claim. (Cl. 56—364)

This invention has reference to a pick-up mechanism to be used in connection with straw gathering and processing machinery, particularly in combination with the apparatus shown and described in the co-pending application for patent of myself and Gentry L. Tallman, entitled "Combine baler", Serial Number 752,194, filed November 9, 1934.

An object of the invention is to provide a novel and efficient pick-up device which co-operates with a conveyor to lift straw or similar material from the ground and place it on the conveyor to be transported to a processing machine such as a baler.

Another object is to provide a device as aforesaid which has the feature of being capable of lifting material from the ground and placing it on the conveyor with a minimum of agitation or distortion of the material.

Other and additional objects will appear in the following specification and drawings, in which:

Fig. 1 is a perspective side elevational view showing a combine baler machine embodying my invention;

Fig. 2 is a side elevational view of the same with certain parts shown in section to permit clearer view of underlying parts;

Fig. 3 is a sectional elevational view taken approximately at line 3—3 in Fig. 4; and Fig. 4 is a detail sectional view taken approximately on line 4—4 in Fig. 3.

The apparatus with which my present invention is to be associated has been shown and described in detail in the above mentioned application for patent and therefore will not require detail description herein further than to say that it consists of the elements shown in Fig. 1, including an elevator conveyor 10 adapted to receive straw gathered from the ground by my pick-up mechanism 11 and discharge the same onto a cross feed conveyor 12 which transports it into a baler 13 to be baled and discharged, all while the machine is being moved over a field.

The apparatus is portably carried upon suitable framing structures supported by ground wheels 14 and 15.

Locomotion is provided by a tractor 16, connected with the baler through a drawbar structure 17. Power to drive the baler and associated mechanism is usually taken from the tractor motor through a power take-off connection 18, although the mechanisms may be driven by an independent motor carried on the baler.

As above set forth, the function of the machine as a whole is to gather hay, stray, alfalfa and similar crops from the ground and process it into bales. The material handled will hereafter be referred to as hay.

As will be obvious, crops such as those mentioned are best gathered and processed with a minimum of tangling, agitation and breakage. This is particularly true in the case of alfalfa and similar leafed plants.

In such plants the food value resides principally in the leaves which, when dried sufficiently to harvest, are very easily broken from the stems and lost while the plants are being picked up and transported to the baler.

With the foregoing in mind, the importance of gentle handling of the plants by the machine will be apparent.

Figs. 1 and 2 illustrate that the elevator conveyor 10 is made up of a number of parallel chains 19 riding over a floor 20. The chains carry a series of spikes 21 and are mounted to run over upper and lower sprockets 22 and 23 mounted on upper and lower shafts 27 and 28. Power to drive the chains is supplied to the lower shaft 28 through a chain 24 and sprocket 25 which has driving connection with an operating element of the baler, such as the gear 26.

The pick-up mechanism comprises a series of pins or tines preferably disposed on each side of the chains 19 as shown best in Fig. 4. The tines are secured in shafts 30, 31 and 32 which are equally spaced around the central shaft 28 and are journalled in bearings formed in the rims of sprockets 23. The tines are preferably made from flexible material or may be otherwise made resiliently movable with respect to the shafts.

Arm members 33 are secured on opposite ends of the shafts 30. There being only one end shown in the drawings, description of it is to be considered as covering the opposite end, which is identical.

Rollers 34 are carried on the ends of the shafts and are engaged in the groove of a stationary cam 35 secured to the frame of the conveyor.

The cam 35 is so fashioned and arms 33 are so disposed with respect to the tines 29 that when sprockets 23 are rotated by the shaft 28 the tines are so positioned with respect to the sprockets and chains 19 as to be particularly efficient in picking up hay from the ground, placing it in engagement with spikes 21 and withdrawing in a manner to cause a minimum of distortion of the hay.

The action is clearly illustrated in Fig. 3. With the sprockets rotating in the direction of the arrow, at the point A, the cam is formed so as to position the tines on a substantially radial line whereby it is made most effective to rake and elevate hay from the ground B, upwardly through positions C and D to place it where it is engaged by spikes 21. The spikes are obviously so disposed as to enter the material during the described movement of the tines.

As the tines and their associated arms progress toward the position D, the cam is formed to lead the arms outwardly, resulting in rotation of shafts 30 in negative direction during its forward progress from D to E which gives the effect, with respect to the hay, of withdrawing the tines in a longitudinal manner.

The hay, having been placed in engagement with spikes 21 is propelled thereby upwardly toward the cross feed conveyor, while the sprockets and shafts 30 continue rotation to propel rollers 34 through the lobed portion F of the cam to complete the withdrawal movement of the tines, after which the portion G of the cam causes forward rotation of the tines in an accelerated manner to restore them to the radial position A to begin another cycle of movement.

It will be seen that my pick-up mechanism is capable of lifting the hay from the ground, placing it in engagement with the spikes 21 and withdrawing the raking elements in a gentle, non-destructive manner, and that by means of the spikes, the elevator conveyor mechanism is capable of transporting the hay with a minimum of agitation and distortion.

The foregoing has described my invention. Modification of structure is obviously possible, without alteration of the principle involved. I do not wish to be limited in structure or function except within the scope of the appended claim.

What I claim is:

A pick-up mechanism comprising a series of spaced apart conveyor-chains equipped with spikes and moving in unison, a driven shaft carrying and actuating one set of the sprocket wheels over which said chains are trained, a plurality of rock-shafts equipped with tines journalled in bearings disposed in the rim portions of said sprocket chains, a crank-arm on each of said shafts, a rigid cam disposed outwardly of said sprocket wheels, and equipped with a cam-groove in which the crank-pins of said crank-arms engage, said cam groove including a major arcuate portion of smaller diameter than said sprocket chains and concentric therewith and a substantially V-shaped portion having an apex disposed substantially midway of the paths of travel of the sprocket-chains between the sets of sprocket wheels over which said chains are trained, the radial distance of the apex from the axis of the first-named sprocket wheels being substantially equal to the radius of the latter, thereby to impart rocking movement to said tines during the intervals of engagement of said crank-pins in said V-shaped portions of the cam groove for the purpose set forth.

LESLIE R. TALLMAN.